No. 659,506. Patented Oct. 9, 1900.
J. J. BRADLEY & L. M. PIGNOLET.
MAGNETIC REGULATOR FOR GALVANOMETERS.
(Application filed Apr. 13, 1899.)
(No Model.)
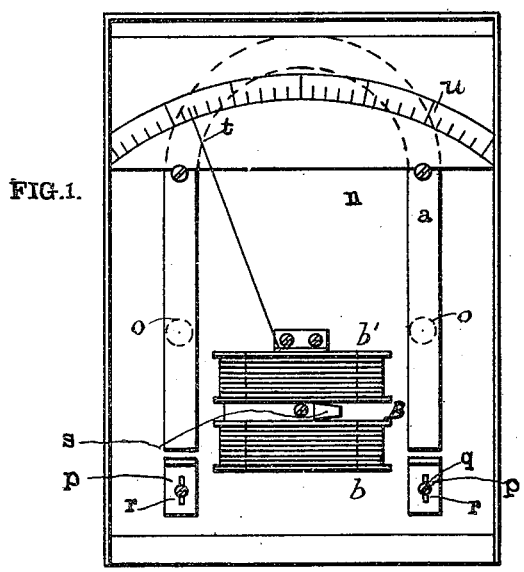
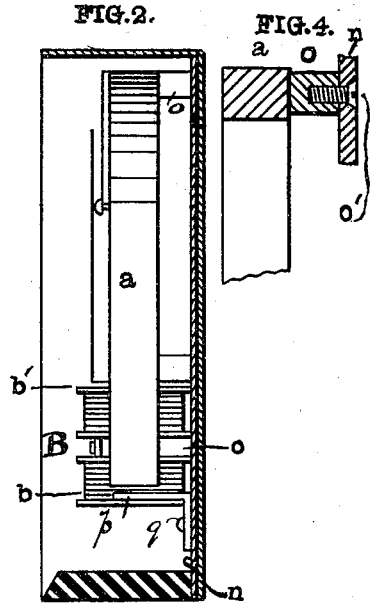
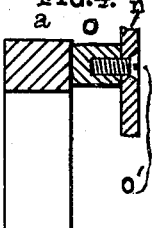
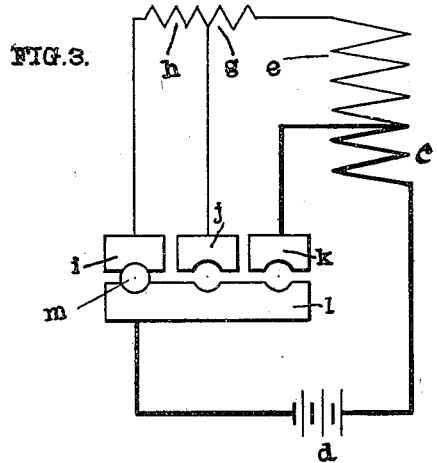
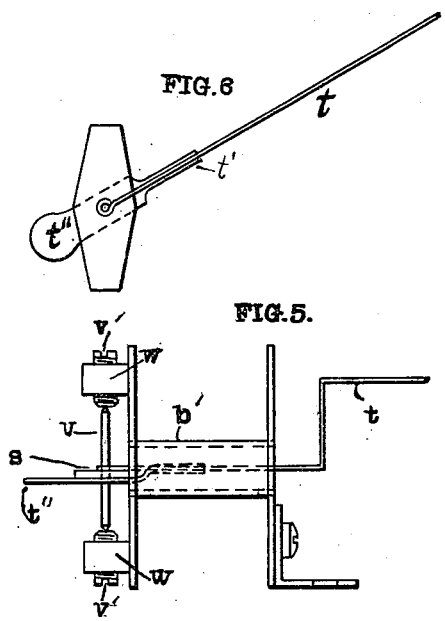
WITNESSES:
A. A. de Bonneville
Sidney D. Lowe.
INVENTORS
J. J. Bradley & L. M. Pignolet.
BY
Edward P. Thompson
ATTORNEY

UNITED STATES PATENT OFFICE.

JAMES J. BRADLEY, OF NEWARK, AND LOUIS M. PIGNOLET, OF ORANGE, NEW JERSEY; SAID BRADLEY ASSIGNOR TO SAID PIGNOLET.

MAGNETIC REGULATOR FOR GALVANOMETERS.

SPECIFICATION forming part of Letters Patent No. 659,506, dated October 9, 1900.

Application filed April 13, 1899. Serial No. 712,841. (No model.)

*To all whom it may concern:*

Be it known that we, JAMES J. BRADLEY, a resident of Newark, and LOUIS M. PIGNOLET, a resident of Orange, in the county of Essex and State of New Jersey, citizens of the United States, have invented a new and useful Improvement in Magnetic Regulators for Galvanometers, of which the following is a specification.

In a general way our invention relates to electrical measuring instruments, and particularly to the construction of a volt-ampere meter.

Heretofore Louis M. Pignolet filed an application, Serial No. 688,072, dated August 8, 1898, for a patent upon a pair of electric forceps for use in surgical operations, and in order to adjust the current for the same it becomes necessary to have an instrument which will regulate and at the same time indicate the current which will heat the jaw of the forceps to the proper temperature with certainty, as it is impossible for the operator, unless after numerous operations, to be sure that the temperature is what it should be for producing a successful closure of the tissues. We have constructed an instrument which is not only adapted for such use, but for similar purposes in the regulation and measurement of comparatively small currents, although it may be constructed on a large scale also. The base-plate of the instrument is made of iron instead, as usual, of brass or other material. We gain by this change in the material not simply a strong base-plate, as that is not at all our object, but by combining such a plate of iron with adjustable angle-irons projecting within magnetic distance of the permanent magnet of the device we acquire means for effectively increasing and adjusting the sensibility of the measuring instrument.

In order to carry out the invention in more detail, we provide the permanent magnet of the instrument with a sheet of iron fastened to said magnet and parallel thereto and located not in contact with the said magnet, but just outside of the limits of the coils of the electromagnet. Projecting up from the iron plate at the poles of the permanent magnet are two bent sheets of iron fastened to the plate by slots and pins, so that the distance between the poles of the magnet and the said pieces of iron may be adjusted. The plate of iron makes the instrument more sensitive, while the adjustable armature-pieces regulate the strength of the magnetism of the permanent magnet and affect its influence upon the needle of the instrument.

The electromagnet or solenoid through which the current to be measured flows is mounted upon the iron base-plate, so that the outer side of the solenoid is parallel as well as close to the plate. The iron base thus forms part of the magnetic circuit of the electromagnet, thereby reducing its magnetic reluctance, so that a certain current flowing through the magnet will produce a stronger magnetic field than would be the case if the iron plate were removed. Thus a greater deflection of the magnetic needle will be produced and the instrument rendered more sensitive. This increases the magnetic intensity of the field in the solenoid, so that a certain current will produce a greater deflection of the magnetic needle than would be the case without the iron plate. The sensitiveness of the instrument is thereby increased. We find the best results are given by a plate of soft iron about one thirty-second of an inch thick, which should project beyond the ends of the solenoid for a distance equal at least to one-fourth the length of the solenoid. The iron plate also acts as a shield to prevent masses of magnetic material, such as iron, which may chance to be near and below the instrument when it is in use from disturbing the magnetic field of the permanent magnet in which the magnetic needle is located. Any disturbance of this kind would render incorrect the indications of the instrument.

For details of the above invention as applied in an actual working device and as to other features of the invention in combination therewith the accompanying drawings are referred to.

Figure 1 is a plan of the instrument, showing all the features that have anything to do with the invention as above alluded to in so far as can be shown by a plan. Fig. 2 is a side view of the same instrument that is shown in Fig. 1. Fig. 3 is a diagram of those circuits which, taken in combination with the other features of the invention, accomplish the complete and accurate regulation and adjustment of the currents that are fed through the same for operating small devices, especially like those already referred to. Fig. 4 is a section of one of the separating-pieces for securing the permanent magnet to the iron base-plate. Fig. 5 is a side elevation of the modified means of supporting the magnetic needle and its pointer upon each other to the arbor and upon the spool. Fig. 6 is a plan of the means of securing together the pointer and the magnetic needle.

In the drawings, $a$ represents the permanent horseshoe-magnet of an electrical measuring instrument, and B is the electromagnet of the same device. This latter magnet has two coils, the coarse series coil $c$, one end of which connects directly to the generator $d$, while the other connects to the one terminal of the fine coil $e$, of much greater length than that of the coarse-wire coil. The other end of the fine coil $e$ is connected to the terminal of a resistance-coil $g$, which in turn connects with the other resistance-coil $h$, and other coils of the same kind may be added, the other terminal in the absence of additional coils being connected to a contact $i$ and the common ends of the coils $g$ and $h$ being connected to a second contact $j$, while the common ends of the coarse and fine coils are connected to a third contact $k$.

$l$ is a contact which may be connected to any one of the contacts $i$ $j$ $k$ by means of a plug $m$.

$n$ is an iron plate large enough to cover the whole face of the horseshoe-magnet and to project beyond the ends and sides, but not lying directly on the said magnet, as this would destroy the object of the invention. The electromagnet lies centrally between the poles of the permanent magnet, as usual in similar instruments, and the sheet of iron $n$ is screwed to spreading and supporting pieces $o$, which in turn are soldered to the permanent magnet, and the lengths of the spreading or separating pieces are such that the plate lies at about the distance from the permanent magnet of half the diameter of the coils. It is unnecessary to state the reason why this is the preferred distance, as experiment has shown that if others carry out this construction they will obtain the best results. Of course this distance may be varied without departing from the spirit of the invention.

$p$ represents small armature-terminals formed conveniently in the shape of angle-irons and having slots through which screws $q$ pass and enter into the plate $n$. The slots are lettered $r$.

The magnetic needle of the instrument is at $s$ and the pointer for the said needle at $t$. The scale $u$ is near the end of the pointer $t$ and laid upon and fastened to the magnet $a$.

The operation of the device and the parts thereof is as follows: The current is turned on in any convenient manner, so that it will flow through the instrument—that is, through the coils or coil $e$ and $c$ and through the resistance or resistances $g$ and $h$. If small currents are to be employed, it is evident that the pointer should be all the more sensitive, and accordingly the armature-pieces $r$ are adjusted to touch or nearly touch the poles of the magnet $n$, and if larger currents are used the adjustment is in the other direction. Electricians can easily understand how the pieces may serve well in the way of making the instrument handy for general use. A certain current, for example, may send the needle-pointer away across the scale, so that the instrument may be useful for measuring the voltage of said current by certain adjustments of the adjustable parts. The operator may therefore insert the resistance of the fine coil with the coarse coil, then also, if necessary, the resistance $g$ and also the resistance $h$, and if that is not enough he may practically remove the armature-pieces, and in this way for all ordinary small currents he may adjust the instrument so that the pointer will give some reading on the scale. Having obtained this adjustment, which may be accomplished by any surgeon, as it involves only mechanical instructions, and having found the indication that will give the proper heat for the forceps, he may then use the instrument in any number of successive operations and rely upon having the proper temperature. The same instrument becomes also a regular measuring instrument after being properly standardized. The electromotive force of a group of battery-cells or the amperes of current of the group may be measured, or with the same instrument the individual cells may be measured as to their electrical dimensions even to the fraction of a volt. It is to be understood, of course, that the resistances of the coils $g$ and $h$ are predetermined and are not taken haphazard. The best way of instructing others in this respect is to give an example. Having adjusted the armature-pieces $r$ either for weak currents or strong currents, as the case may be, let it be supposed that the total resistance of both coils and resistances $c$, $e$, $g$, and $h$ is one thousand ohms. Let the resistance of the coils $c$ $e$ and the coil $g$ be one hundred ohms. With the plug at $k$ the deflection of the needle will be proportioned to the number of amperes of current. When the plug is at the contact $j$, the pointer $t$ will be deflected proportionally to the electromotive force of the generator. The deflection will be only one-tenth as much when the plug is at $i$ in view of the proportion of the resistances adopted in this example, or, again, if the instrument be calibrated, so that with the plug $m$ at $i$ each division on the scale represents one volt, then with the plug at $j$ each division would represent one-tenth of a volt, and the device would be suitable for testing single cells of storage batteries or other batteries or small generators and at the same time would serve to measure the total voltage of all the cells.

Referring to Fig. 4, where $a$ is the permanent magnet, $o$ the separating-piece, and $n$ the iron plate, $o'$ is a flat-headed screw passing through a countersunk hole in the plate and a threaded hole in the separating-piece $o$, which in turn is soldered to the steel magnet $a$. By this means it becomes unnecessary to drill holes into the steel magnet, whereas the separating-piece $o$ is readily drilled, being of a comparatively soft non-magnetic material, such as brass.

Referring to Figs. 5 and 6, $b'$ is the right-hand spool in Fig. 2, the winding being omitted. The pointer $t$ extends through the opening at the center of the spool $b'$, is clasped by the split tube $t'$, and extends farther, terminating in an eye, through which passes the arbor $v$, which is pivoted at the screws $v'$, so that it may rotate freely. The arbor $v$ passes through and is secured to the magnetic needle $s$ and to the counterweight $t''$, which is an extension of the tube $t'$, projecting from the said needle on the side opposite the tube $t'$, so that the arbor $v$ is held delicately under equilibrium. The screws $v'$ are held by the projection $w$, extending from the outside of the spool $b'$.

We claim as our invention—

1. In an electrical measuring instrument, the combination of a permanent horseshoe-magnet, a plate of iron large enough to extend beyond the limits of the poles thereof, and a solenoid containing the magnetic needle, the outer side of said solenoid being contiguous to said plate.

2. In an electrical measuring instrument the combination of a permanent magnet, a solenoid containing the magnetic needle of the instrument and a plate of iron parallel to said magnet and contiguous to the outside of said solenoid beyond the ends of which said plate projects.

3. In an electrical measuring instrument, the combination of a permanent horseshoe-magnet, an iron plate located at a predetermined distance below the magnet as and for the purpose set forth, for shielding the magnetic field between the poles thereof, and a solenoid containing the magnetic needle and located between the poles of the magnet contiguous to the said plate of iron.

4. In an electrical measuring instrument, the combination with the permanent horseshoe-magnet thereof, of a plate of iron non-magnetically secured thereto at a predetermined distance therefrom, and a solenoid located between the poles of the magnet and containing the magnetic needle of the instrument the outside of said solenoid being parallel as to its axis and contiguous to the plate of iron.

5. In an electrical measuring instrument the combination with a permanent horseshoe-magnet thereof, of a plane sheet of iron parallel to the magnet, separating-pieces of non-magnetic material securing said sheet to said magnet, and angle-irons having slots and secured to said sheet by screws passing through said slots, and into said sheet.

6. In an electrical measuring instrument, the combination with a permanent horseshoe-magnet thereof, of a plate of iron non-magnetically secured thereto at a predetermined distance therefrom and large enough to extend beyond the outside limits of the poles of the magnet, and armature-pieces connected directly to said plate and adjustable to and from said magnet.

7. In an electrical measuring instrument, the combination of a permanent horseshoe-magnet, a solenoid containing the magnetic needle of the instrument, a plate of iron parallel to said magnet at about the distance therefrom of the radius of said solenoid, armature-pieces connected to said plate and adjustable to and from the poles of said magnet, said solenoid consisting of a long fine-wire coil and of a short coarse-wire coil, ohmic resistances, and means for including in the outside circuit either the coarse coil alone, or with the fine coil only or together with said resistances.

8. In an electrical measuring instrument having a permanent magnet and a base-plate, separating-pieces between the above-named elements, one end of the separating-piece being soldered to the permanent magnet, and a screw passing through said plate into said separating-piece.

9. In an electrical measuring instrument, the combination of a rotary arbor, a magnetic needle carried thereby, a tube fixed to said needle and extending therefrom, and a pointer passing through and clasped by said tube and terminating in an eye through which said arbor passes.

In testimony whereof we have hereunto subscribed our names this 11th day of April, 1899.

JAMES J. BRADLEY. [L. S.]
LOUIS M. PIGNOLET. [L. S.]

Witnesses:
JOSHUA D. DAY,
CHAS. S. CLAPP.